(12) United States Patent
Williams et al.

(10) Patent No.: US 12,316,703 B2
(45) Date of Patent: May 27, 2025

(54) MESSAGING IN DISTRIBUTED NETWORKS

(71) Applicant: DFINITY STIFTUNG, Zurich (CH)

(72) Inventors: Dominic Williams, Palo Alto, CA (US);
Jan Camenisch, Thalwil (CH); Allen Clement, Birmensdorf (CH); David Derler, Horgen (CH); Mariu Drijvers, Zurich (CH)

(73) Assignee: DFINITY STIFTUNG, Zurich (CH)

( * ) Notice: Subject to any disclaimer, the term of this patent is extended or adjusted under 35 U.S.C. 154(b) by 194 days.

(21) Appl. No.: 17/769,799

(22) PCT Filed: Oct. 18, 2019

(86) PCT No.: PCT/EP2019/078405
§ 371 (c)(1),
(2) Date: Apr. 18, 2022

(87) PCT Pub. No.: WO2021/073755
PCT Pub. Date: Apr. 22, 2021

(65) Prior Publication Data
US 2022/0377136 A1   Nov. 24, 2022

(51) Int. Cl.
*H04L 67/104* (2022.01)
*H04L 9/40* (2022.01)
*H04L 45/02* (2022.01)

(52) U.S. Cl.
CPC ............ *H04L 67/104* (2013.01); *H04L 45/04* (2013.01); *H04L 63/12* (2013.01)

(58) Field of Classification Search
CPC ..... H04L 67/104; H04L 45/04; H04L 9/3239; H04L 9/3247; H04L 9/50; H04L 41/0663; H04L 63/12
(Continued)

(56) References Cited

U.S. PATENT DOCUMENTS

| 2002/0178281 A1* | 11/2002 | Aizenbud-Reshef ... H04L 43/50 702/57 |
| 2004/0227404 A1* | 11/2004 | Boros ...................... G06F 1/26 307/43 |

(Continued)

FOREIGN PATENT DOCUMENTS

| CN | 1517917 A | * 8/2004 | ......... G06F 16/2336 |
| CN | 1917470 A | * 2/2007 | .......... H04L 12/185 |

(Continued)

OTHER PUBLICATIONS

International Search Report for International Application No. PCT/EP2019/078405 mailed on May 4, 2020, pp. 2.
(Continued)

*Primary Examiner* — David R Lazaro
*Assistant Examiner* — Mariegeorges A Henry
(74) *Attorney, Agent, or Firm* — Mannava & Kang, P.C.

(57) ABSTRACT

According to an embodiment of a first aspect of the invention, there is provided a distributed network comprising a plurality of subnets. Each of the plurality of subnets comprises a plurality of nodes. The network is configured to run a set of computational units and to assign each of the computational units to one of the plurality of subnets according to a subnet-assignment, thereby creating an assigned subset of the set of computational units for each of the subnets. The network is further configured to run on each node of the plurality of subnets the assigned subset of the computational units and to replicate the assigned subsets of the computational units across the respective subnets. The network is further configured to exchange unit-to-unit messages between the computational units via a messaging protocol based on the subnet-assignment. Further aspects of the invention relate to a corresponding computer-imple- (Continued)

1300 mented method, a node, a computer program product and a software architecture.

19 Claims, 8 Drawing Sheets

(58) Field of Classification Search
USPC .......................................................... 709/223
See application file for complete search history.

(56) References Cited

U.S. PATENT DOCUMENTS

2011/0004690 A1* 1/2011 Georgel ................. H04L 47/10
709/227
2018/0113752 A1 4/2018 Derbakova et al.

FOREIGN PATENT DOCUMENTS

| CN | 109040198 | A | * | 12/2018 | ............. | H04L 63/12 |
|----|-----------|---|---|---------|--------------|------------|
| DE | 102016224537 | A1 | * | 6/2018 | ........... | H04L 9/3236 |
| EP | 1699181 | A1 | * | 9/2008 | ......... | H04L 12/4641 |
| JP | 2006260400 | A | | 9/2006 | | |
| JP | 4509248 | B2 | * | 7/2010 | ............. | G06F 15/17 |
| JP | 2012530328 | A | | 11/2012 | | |
| JP | 2019526945 | A | | 9/2019 | | |
| KR | 101975822 | B1 | | 5/2019 | | |
| KR | 1020190069554 | A | | 6/2019 | | |
| KR | 1020190100177 | A | | 8/2019 | | |
| KR | 1020190108019 | A | | 9/2019 | | |

OTHER PUBLICATIONS

Timo Hanke, et al., "DFINITY Technology Overview Series Consensus System", Proceedings of Technology Overview Series, Jan. 23, 2018, 16 pages.

Japanese Patent Office, "Machine English translation of Notice of Reasons for Refusal for Japanese Application No. 2022-522808", dated Feb. 22, 2024, 2 pages.

Korean Intellectual Property Office, "Machine English translation of the Written Decision on Registration for Application No. KR-10-2022-7016516", dated Dec. 24, 2024, 3 pages.

* cited by examiner

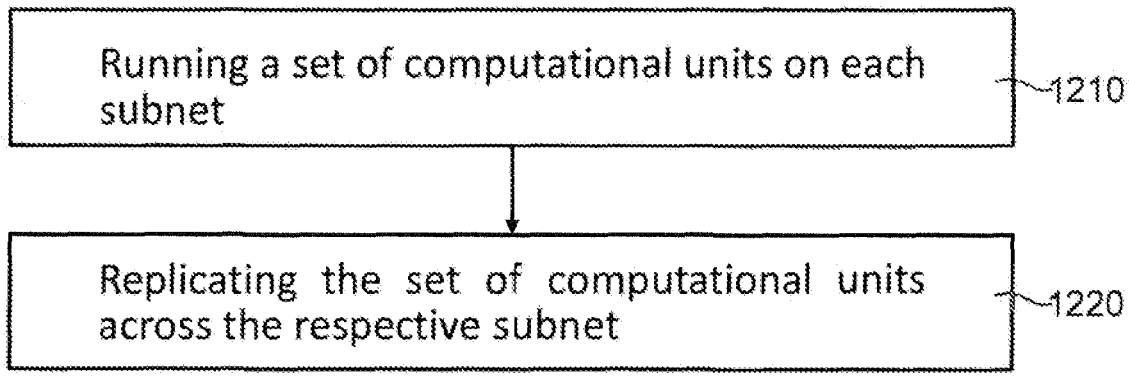
1201   FIG. 12a
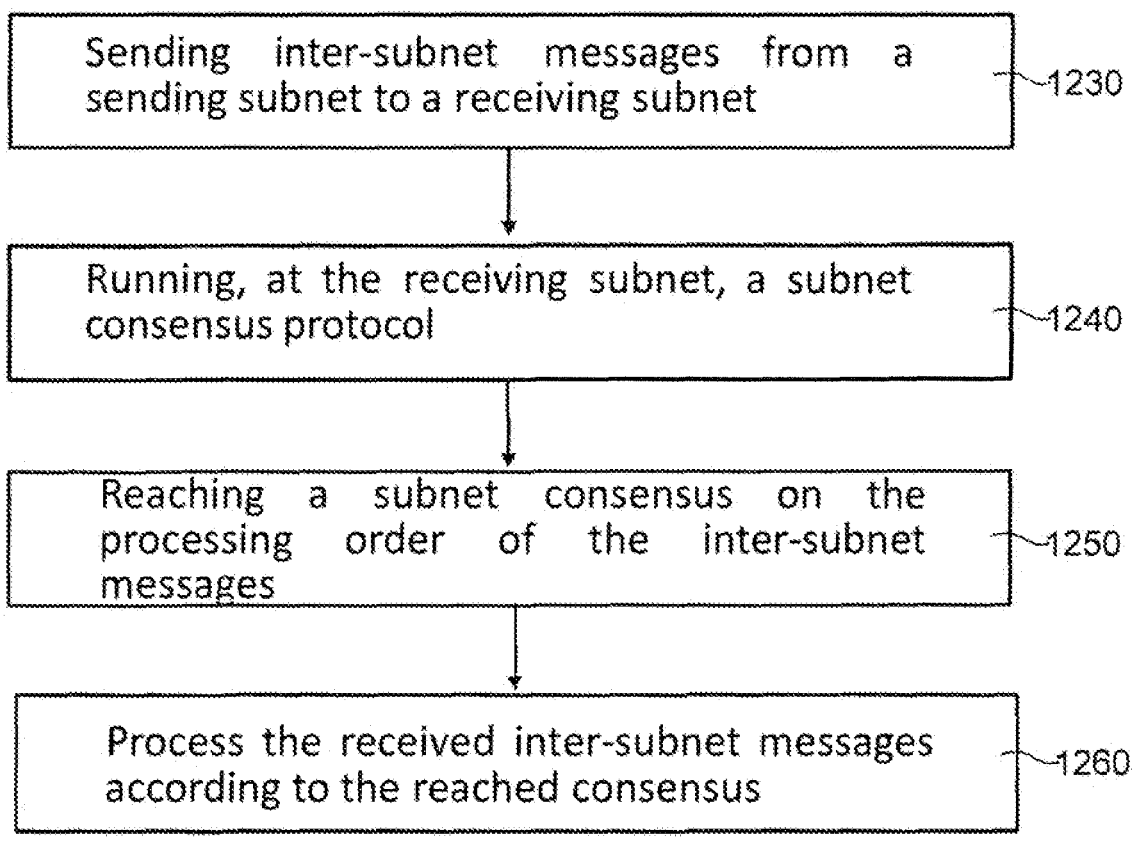
1202   FIG. 12b

MESSAGING IN DISTRIBUTED NETWORKS

CLAIM FOR PRIORITY

The present application is a national stage filing under 35 U.S.C 371 of PCT application number PCT/EP2019/078405, having an international filing date of Oct. 18, 2019, the disclosure of which is hereby incorporated by reference in its entirety.

TECHNICAL FIELD

The present invention pertains to a distributed network comprising a plurality of subnets. Each subnet comprises a plurality of nodes.

Further aspects relate to a method for exchanging messages between the nodes of the subnets, a node of a distributed network, a corresponding computer program product and a software architecture encoded on a non-transitory medium.

BACKGROUND ART

In distributed networks a plurality of nodes are arranged in a distributed fashion. In distributed networks computing, software and data are spread out across the plurality of nodes. The nodes establish computing resources and the distributed networks may use distributed computing techniques.

An example of distributed networks are blockchain networks. Blockchain networks are consensus-based, electronic ledgers based on blocks. Each block comprises transactions and other information. Furthermore, each block contains a hash of the previous block so that blocks become chained together to create a permanent, unalterable record of all transactions which have been written to the blockchain. Transactions may contain small programs known e.g. as smart contracts.

In order for a transaction to be written to the blockchain, it must be "validated" by the network. In other words, the network nodes have to gain consent on blocks to be written to the blockchain. Such consent may be achieved by various consensus protocols.

One type of consensus protocols are proof-of-work consensus protocols. A proof-of-work consensus protocol generally requires some work from the parties that participate in the consensus protocol, usually corresponding to processing time by a computer. Proof-of-work-based cryptocurrency systems such as Bitcoin involve the solving of computationally intensive puzzles to validate transactions and to create new blocks.

Another type of consensus protocols are proof-of-stake-consensus protocols. Such proof-of-stake protocols have the advantage that they do not require time-consuming and energy-intensive computing. In proof-of-stake based blockchain networks e.g. the creator of the next block is chosen via combinations of random selection as well as the stake of the respective node in the network.

Apart from cryptocurrencies, distributed networks may be used for various other applications. In particular, they may be used for providing decentralized and distributed computing capabilities and services.

US 2018/0113752 discloses inter-ledger messaging in a blockchain. One example method of operation may include receiving a blockchain transaction sent from a first blockchain to a second blockchain, identifying an inter-ledger contract between the first blockchain and the second blockchain, receiving an inter-ledger message at the second blockchain from the first blockchain, and determining whether to log the blockchain transaction in the first blockchain or the second blockchain based on the inter-ledger message.

Accordingly, there is a need for distributed networks with enhanced functionalities.

DISCLOSURE OF THE INVENTION

Accordingly, one object of an aspect of the invention is to provide a distributed network with enhanced functionalities.

According to an embodiment of a first aspect of the invention, there is provided a distributed network comprising a plurality of subnets. Each of the plurality of subnets comprises a plurality of nodes. The network is configured to run a set of computational units and to assign each of the computational units of the set of computational units to one of the plurality of subnets according to a subnet-assignment, thereby creating an assigned subset of the set of computational units for each of the subnets. The network is further configured to run on each node of the plurality of subnets the assigned subset of the computational units and to replicate the assigned subsets of the computational units across the respective subnets. The network is further configured to exchange unit-to-unit messages between the computational units via a messaging protocol based on the subnet-assignment.

The computational units are a piece of software that is running on a node of the distributed network and which has its own unit state, wherein the unit state comprises an input queue and an output queue of unit-to-unit messages.

The unit-to-unit messages comprise inter-subnet unit-to-unit messages to be exchanged between computational units assigned to different subnets and intra-subnet unit-to-unit messages to be exchanged between computational units assigned to the same subnet.

The network is configured to store the subnet-assignment as network configuration data. Furthermore, the messaging protocol may be configured to exchange the inter-subnet unit-to-unit messages between a sending computational unit and a receiving computational unit by looking up the subnet-assignment of the receiving computational unit in the network configuration data and by routing the inter-subnet unit-to-unit message to the subnet that is assigned to the receiving computational unit according to the subnet assignment.

Such networks according to embodiments of the invention may facilitate the exchange of unit-to-unit messages between the computational units of the network in an efficient and reliable way. Furthermore, such networks may facilitate the replication of the unit states of the computational units across the respective nodes of the subnet.

Accordingly, such a distributed network provides replicated computational units that may communicate with each other.

The embodied method provides an efficient and flexible routing mechanism.

A unit-to-unit message may be defined as a message that is exchanged between different computational units of the distributed network.

A computational unit may be defined as a piece of software that is running on a node of the network and which has its own unit state. Each of the subnets is configured to replicate the set of computational units, in particular the states of the computational units, across the subnet. As a result, the computational units of a respective subnet have always the same state, provided they behave honestly.

According to embodiments, the replication of the unit state of the computational units may be facilitated by performing an active replication in space of the assigned subset of the computational units on each node of the subnets. More particularly, the messaging protocol may be configured to perform a deterministic and replicated computation. According to embodiments, the unit state may comprise in particular an input queue, an output queue, a system state and an application or user state.

The messaging protocol may be defined as a protocol that manages the exchange of unit-to-unit messages. In particular, the messaging protocol may be configured to route the unit-to-unit messages from a sending subnet to a receiving subnet. For this, the messaging protocol uses the respective subnet-assignment. The subnet-assignment indicates to the messaging protocol the respective location/subnet of the computational units of the respective communication.

According to embodiments, the messaging protocol is configured to route the inter-subnet unit-to-unit messages from a sending subnet to a plurality of receiving subnets into output streams sorted by the plurality of receiving subnets.

This is a particular efficient routing mechanism for inter-subnet unit-to-unit messages.

According to embodiments, the messaging protocol is further configured to provide signalling messages adapted to acknowledge or not acknowledge an acceptance of the unit-to-unit messages. The acknowledgment may be provided in particular for individual unit-to-unit messages.

According to such an embodiment, the signalling messages may comprise acknowledgment messages to positively acknowledge by the receiving subnet that a message has been successfully received. On the other hand, the signalling messages may be embodied as non-acknowledgement or error messages to indicate that a message cannot be positively acknowledged and had to be rejected, e.g. for capacity or other reasons. In such a case the error message may trigger the sending subnet to resend the corresponding message.

According to embodiments, the messaging protocol is configured to send the signalling messages from a receiving subnet to a corresponding sending subnet and to store sent unit-to-unit messages until the acceptance has been acknowledged.

This may provide a guaranteed delivery.

According to embodiments, the network is further configured to receive and process ingress messages from users of the network.

Such ingress messages may be e.g. execution requests addressed to a computational unit of the network to perform some computational tasks. An ingress message may be generally defined as a message that is provided externally to the network, in particular via an external interface, in particular from external users of the network.

According to an embodiment, the network is configured to run a consensus protocol adapted to reach a consensus on a selection and/or processing order of a subset of the unit-to-unit messages, in particular of inter-subnet unit-to-unit messages.

For networks which are configured to receive and process ingress messages, the network may be configured to run a consensus protocol adapted to reach a consensus on a selection and/or processing order of the unit-to-unit messages and the ingress messages.

According to embodiments, the messaging protocol may provide the unit-to-unit messages to the consensus protocol.

The consensus protocol may perform then a consensus algorithm to reach a consensus on the selection and/or processing order of inter-subnet unit-to-unit messages received by one of the plurality of subnets from one or more other subnets of the plurality of subnets. More particularly, the consensus protocol may select the inter-subnet unit-to-unit messages to be processed and it may agree on a corresponding processing order.

After the consensus has been reached, the consensus protocol may provide the selected messages and the corresponding processing order to the messaging protocol for further processing.

According to embodiments, the network is further configured to run the consensus protocol separately on each subnet. Furthermore, each of the subnets may be configured to reach a local subnet-consensus on the selection and/or processing order of the inter-subnet unit-to-unit messages received by the respective subnet.

According to such an embodiment, each of the subnets may decide independently and on its own on the selection and/or processing order of received inter-subnet messages. Such a local subnet consensus provides advantages in terms of efficiency and scalability. Furthermore, it allows to take individual needs of the respective subnet into account.

In particular, it allows to run different consensus algorithms on the different subnets. In this respect, the consensus protocol may comprise several different consensus algorithms which may be used by the different subnets in accordance with their individual needs, requirements and/or preferences. Furthermore, the consensus protocol may have different versions according to embodiments.

According to embodiments, each of the plurality of subnets is configured to run a separate subnet protocol client on its nodes. The separate subnet protocol client comprises a separate subnet messaging component and a separate subnet consensus component. Each of the separate consensus protocol clients of the respective subnet is configured to reach a subnet consensus on the selection and/or processing order of the unit-to-unit messages received from one or more other subnets of the plurality of subnets.

According to such an embodiment, each subnet may run its own, individual subnet protocol client independently from the other subnets.

According to an embodiment, the consensus protocol is configured to receive and process the unit-to unit messages, in particular the inter-subnet unit-to-unit messages, and the ingress messages of the plurality of subnets and to generate a queue of input blocks from the unit-to-unit messages and the ingress messages according to a predefined consensus mechanism. Once consensus has been achieved, the consensus protocol provides the queue of input blocks to the messaging protocol for further processing. Such input blocks facilitate an efficient and secure processing of the inter-subnet unit-to-unit messages and the ingress messages.

According to embodiments, the network is configured to perform as consensus protocol a proof-of-stake consensus protocol.

The proof-of-stake consensus protocol aims at reaching a consensus on the processing order of inter-subnet messages and ingress messages, in particular on the next input block that shall be created for further processing by the messaging protocol.

According to some embodiments, all nodes of respective subnet may participate in the consensus protocol. According to other embodiments, the consensus protocol is further configured to elect members of a committee from the plurality of nodes of the subnet according to a predefined election scheme and to perform the consensus protocol with the elected members of the committee.

Such a network may achieve a high transaction rale and short finalization time as the committee may be significantly smaller than the full set of nodes of the subnet. Such an embodiment is in particular useful for large subnets comprising hundreds or thousands of nodes. The committee may then comprise only 20-60 nodes as an example. Hence the committee can act more efficiently than if all nodes in the subnet would be involved. Such a committee may also be denoted as notarization committee as it is entitled to notarize input blocks.

According to some embodiments a threshold relay scheme may be used. More particularly, networks according to embodiments of the invention may use a threshold relay, a distributed random beacon that is maintained by subsequent notarization committees of randomly selected nodes of the respective subnet. The output of the random beacon is used as entropy in the system, e.g., for ranking block proposers and for composing new generations of committees. Such a threshold relay scheme is described e.g. in the document by Timo Hanke, Mahnush Movahedi and Dominic Williams, DFINITY Technology Overview Series, Consensus System, Rev. 1, https://dfinity.org/static/dfinity-consensus-0325c35128c72b42df7dd30c22c41208.pdf According to embodiments, the messaging protocol is configured to be clocked by the input blocks received from the consensus protocol. This facilitates an efficient and synchronous processing of the input blocks.

According to embodiments, the consensus protocol is further configured to add one or more execution parameters to the input blocks. The execution parameters may include a random seed, a designated execution time and/or a height index. Such execution parameters may further facilitate and enhance the efficiency and/or security of the processing of the input blocks and its corresponding messages.

The random seed may be used e.g. to achieve pseudo-randomness in execution if needed. The height index may e.g. be an ascending index of the input blocks to facilitate an in-order processing of the input blocks.

According to embodiments, the messaging protocol is configured to perform one or more input checks for the input blocks and/or the inter-subnet messages, in particular the inter-subnet unit-to-unit messages, and the ingress messages of the input blocks received from the consensus protocol. The one or more input checks may comprise an overload check, an in-order delivery check and/or a validity check of the target destination. An overload check may prevent that the messaging component and a subsequent execution component get overloaded by too many input blocks and/or input messages. The in-order delivery check may be performed e.g. by checking the height index. The validity check may comprise any suitable check to guarantee the validity of the input block and the corresponding messages and to discard false input blocks or messages.

According to embodiments, the network comprises an execution component configured to run an execution procedure for executing execution messages. The execution messages may comprise unit-to-unit messages and/or ingress messages. The execution procedure is in particular configured to perform a deterministic and replicated computation of the execution messages. The execution procedure may be an execution protocol or an execution algorithm.

Hence according to such an embodiment the messaging component and the execution component may both perform a replicated and deterministic computation. In combination with the consensus component that runs the consensus protocol and ensures that the replicated computational units of the nodes of the respective subnet receive the same input, a full replication of the unit state of the computational units may be achieved.

According to embodiments, the network comprises a certification component. The certification component is configured to certify the output streams by the respective subnet, in particular by a threshold-signature, a multi-signature or a collection of individual signatures of the computational units of the respective subnet.

A multi-signature is a digital signature which allows the computational units of a subnet to sign the output streams jointly. Such a joint signature is usually more compact than a collection of individual signatures of all computational units of the subnet.

According to embodiments, the subnet messaging component comprises an induction pool component, a state storage component for storing the unit state and an output queue component.

According to an embodiment, the network further comprises a networking component configured to run a networking protocol. The networking protocol may comprise a unicast component configured to perform a node-to-node communication, a broadcast component configured to perform an intra-subnet communication and/or a cross-net component configured to perform an inter-subnet communication.

According to a further embodiment, each of the plurality of nodes is configured to run a mainnet protocol client. The mainnet protocol client is in particular configured to distribute configuration data to the plurality of subnets. The configuration data may comprise in particular the subnet assignment.

According to an embodiment, each of the plurality of subnets comprises at least 4 nodes.

According to an embodiment of a method aspect of the invention, a computer-implemented method for performing unit-to-unit communication in a distributed network is provided. The distributed network comprises a plurality of subnets, wherein each of the plurality of subnets comprises a plurality of nodes. The method comprises steps of running a set of computational units and assigning each of the computational units of the set of computational units to one of the plurality of subnets according to a subnet-assignment, thereby creating an assigned subset of the set of computational units for each of the subnets. The method further comprises running on each node of the plurality of subnets the assigned subset of the computational units, replicating the assigned subsets of the computational units across the respective subnet and exchanging unit-to-unit messages between the computational units via a messaging protocol based on the subnet-assignment.

According to an embodiment of another aspect of the invention, a node of a distributed network is provided.

According to an embodiment of another aspect of the invention, a computer program product for operating a distributed network is provided. The computer program product comprises a computer readable storage medium having program instructions embodied therewith, the program instructions executable by one or more of a plurality of nodes of the distributed network to cause the one or more of the plurality of nodes to perform steps of the method aspect of the invention.

According to an embodiment of another aspect of the invention, a computer program product for operating a node of a distributed network is provided.

According to an embodiment of another aspect of the invention, a software architecture encoded on a non-transitory computer readable medium is provided. The software architecture is configured to operate one or more nodes of a distributed network. The encoded software architecture comprises program instructions executable by one or more of the plurality of nodes to cause the one or more of the plurality of nodes to perform a method comprising steps of the method aspects of the invention.

Features and advantages of one aspect of the invention may be applied to the other aspects of the invention as appropriate.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein:

FIG. 12a and FIG. 12b show flow charts comprising method steps of a computer-implemented method for exchanging inter-subnet messages between subnets of a distributed network.

MODES FOR CARRYING OUT THE INVENTION

At first, some general aspects and terms of embodiments of the invention will be introduced.

According to embodiments, a distributed network comprises a plurality of nodes that are arranged in a distributed fashion. In such a distributed network computing, software and data is distributed across the plurality of nodes. The nodes establish computing resources and the distributed network may use in particular distributed computing techniques.

According to embodiments, distributed networks may be in particular embodied as blockchain networks. The term "blockchain" shall include all forms of electronic, computer-based, distributed ledgers. According to some embodiments, the blockchain network may be embodied as proof-of-work blockchain network. According to other embodiments, the blockchain network may be embodied as proof-of-stake blockchain network.

Figure 1:
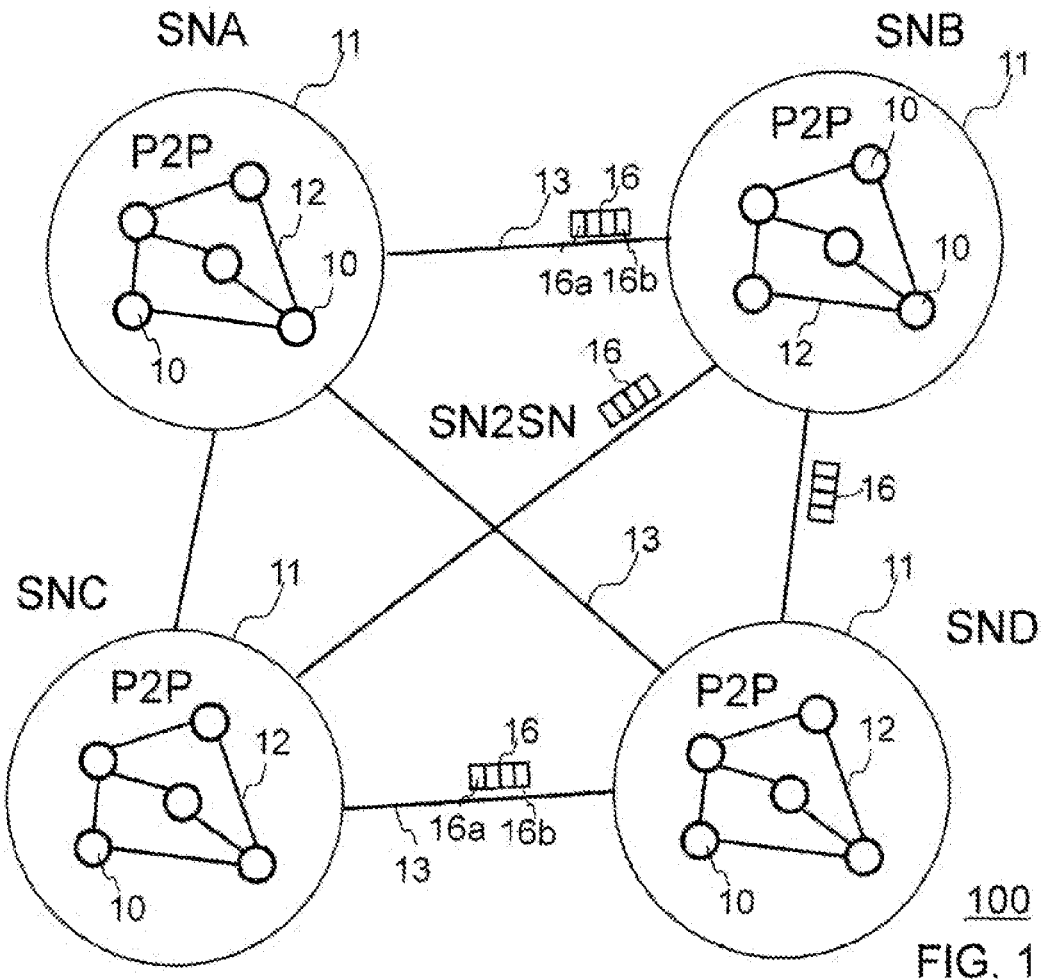
FIG. 1 shows an exemplary block diagram of a distributed network according to an embodiment of the invention.

FIG. 1 shows an exemplary block diagram of a distributed network 100 according to an embodiment of the invention.

The distributed network 100 comprises a plurality of nodes 10, which may also be denoted as network nodes 10. The plurality of nudes 10 are distributed over a plurality of subnets 11. In the example of FIG. 1, four subnets 11 denoted with SNA, SNB, SNC and SND are provided.

Each of the plurality of subnets 11 is configured to run a set of computational units on each node 10 of the respective subnet 11. According to embodiments a computational unit shall be understood as a piece of software, in particular as a piece of software that comprises or has its own unit state.

The network 100 comprises communication links 12 for intra-subnet communication within the respective subnet 11, in particular for intra-subnet unit-to-unit messages to be exchanged between computational units assigned to the same subnet.

Furthermore, the network 100 comprises communication links 13 for inter-subnet communication between different ones of the subnets 11, in particular for inter-subnet unit-to-unit messages to be exchanged between computational units assigned to different subnets.

Accordingly, the communication links 12 may also be denoted as intra-subnet or Peer-to-Peer (P2P) communications links and the communication links 13 may also be denoted as inter-subnet or Subnet-to-Subnet (SN2SN) communications links.

According to embodiments, a unit state shall be understood as all the data or information that is used by the computational unit, in particular the data that the computational unit stores in variables, but also data the computational units get from remote calls. The unit state may represent in particular storage locations in the respective memory locations of the respective node. The contents of these memory locations, at any given point in the execution of the computational units, is called the unit state according to embodiments. The computational units may be in particular embodied as stateful computational units, i.e. the computational units are designed according to embodiments to remember preceding events or user interactions.

According to embodiments of the invention the subnets 11 are configured to replicate the set of computational units across the respective subnet 11. More particularly, the subnets 11 are configured to replicate the unit state of the computational units across the respective subnet 11.

The network 100 may be in particular a proof-of-stake blockchain network.

Proof-of-stake (PoS) describes a method by which a blockchain network reaches distributed consensus about which node is allowed to create the next block of the blockchain. PoS-methods may use a weighted random selection, whereby the weights of the individual nodes may be determined in particular in dependence on the assets (the "stake") of the respective node.

Figure 2:
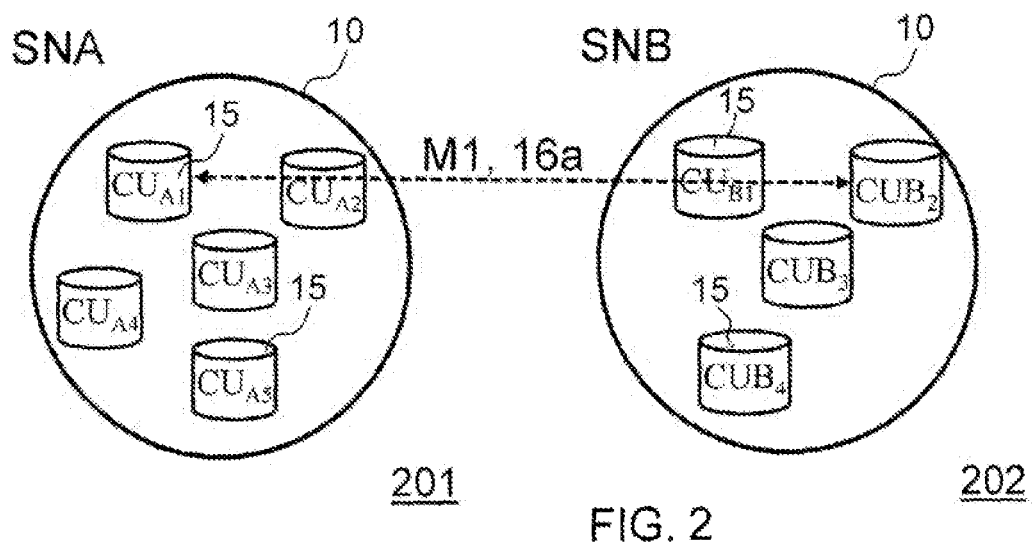
FIG. 2 illustrates in a more detailed way computational units running on nodes of the network.

FIG. 2 illustrates in a more detailed way computational units 15 running on nodes 10 of the network 100. The network 100 is configured to assign each of the computational units which are running on the network 100 to one of the plurality of subnets, in this example to one of the subnets SNA, SNB, SNC or SND according to a subnet-assignment. The subnet-assignment of the distributed network 100 creates an assigned subset of the whole set of computational units for each of the subnets SNA, SNB, SNC and SND.

More particularly, FIG. 2 shows on the left side 201 a node 10 of the subnet SNA of FIG. 1. The subnet assignment of the distributed network 100 has assigned a subset of five computational units 15 to the subnet SNA more particularly the subset of computational units $CU_{A1}$, $CU_{A2}$, $CU_{A3}$, $CU_{A4}$ and $CU_{A5}$. The assigned subset of computational units $CU_{A1}$, $CU_{A2}$, $CU_{A3}$, $CU_{A4}$ and $CU_{A5}$ runs on each node of the subnet SNA. Furthermore, the assigned subset of computational units $CU_{A1}$, $CU_{A2}$, $CU_{A3}$, $CU_{A4}$ and $CU_{A5}$ is replicated across the whole subnet SNA such that each of the computational units $CU_{A1}$, $CU_{A2}$, $CU_{A3}$, $CU_{A4}$ and $CU_{A5}$ has the same unit state. This may be implemented in particular by performing an active replication in space of the unit state of the computational units $CU_{A1}$, $CU_{A2}$, $CU_{A3}$, $CU_{A4}$ and $CU_{A5}$ on each of the nodes 10 of the subnet SNA.

Furthermore, FIG. 2 shows on the right side 202 a node 10 of the subnet SNB of FIG. 1. The subnet assignment of the distributed network 100 has assigned a subset of four computational units 15 to the subnet SNB, more particularly the assigned subset of computational units $CU_{B1}$, $CU_{B2}$, $CU_{B3}$ and $CU_{B4}$. The assigned subset of computational units $CU_{B1}$, $CU_{B2}$, $CU_{B3}$ and $CU_{B4}$ runs on each node 10 of the subnet SNB. Furthermore, the assigned subset of computational units $CU_{B1}$, $CU_{B2}$, $CU_{B3}$ and $CU_{B4}$ is replicated across the whole subnet SNB such that each of the computational units $CU_{B1}$, $CU_{B2}$, $CU_{B3}$ and $CU_{B4}$ has the same unit state, e.g. by performing an active replication in space of the unit state as mentioned above.

Referring back to FIG. 1, the network 100 is configured to exchange unit-to-unit messages between the computational units of the network via a messaging protocol based on the subnet-assignment.

According to embodiments, the distributed network may be in particular configured to exchange inter-subnet messages 16 between the subnets SNA, SNB, SNC and SND via a messaging protocol. The inter-subnet messages 16 may be in particular embodied as inter-subnet unit-to-unit messages 16a to be exchanged between computational units that have been assigned to different subnets according to the subnet-assignment. As an example, the distributed network 100 may be configured to exchange a unit-to-unit message M1, 16a between the computational unit $CU_{A1}$ as sending computational unit running on the subnet SNA and the computational unit $CU_{B2}$ as receiving computational unit running on the subnet SNB. In addition, the inter-subnet messages 16 may be embodied as signalling messages 16b. The signalling messages 16b may encompass acknowledgement messages (ACK) adapted to acknowledge an acceptance or receipt of the unit-to-unit messages or non-acknowledgement messages (NACK) adapted to not-acknowledge an acceptance (corresponding to a rejection) of the unit-to-unit messages, e.g. to indicate a transmission failure.

Figure 10:
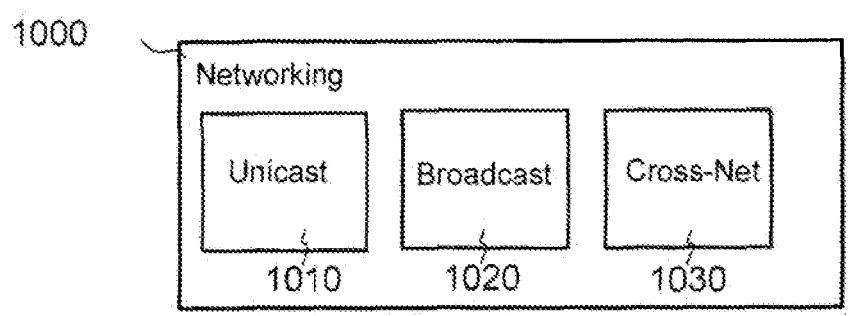
FIG. 10 shows a more detailed view of a networking component.

The network 100 may be in particular configured to store the subnet-assignment of the computational units 10 as network configuration data, e.g. in the networking component 1000 as shown in FIG. 10, in particular in the cross-net component 1030.

The messaging protocol may then look up the subnet-assignment of the receiving computational unit in the network configuration data. In the above example it will find that the receiving computational unit $CU_{B2}$ is located in the subnet SNB and will route the corresponding inter-subnet unit-to-unit message M1 to the subnet SNB.

According to further embodiments, the network 100 may be configured to exchange the inter-subnet messages 16 via a messaging protocol and a consensus protocol. The consensus protocol may be configured to reach a consensus on the selection and/or processing order of the inter-subnet messages 16 at the respective receiving subnet.

Referring e.g. to the subnet SNB, it receives inter-subnet messages 16 from the subnets SNA, SNC and SND. The consensus protocol receives and processes these inter-subnet messages 16 and performs a predefined consensus algorithm or consensus mechanism to reach a consensus on the selection and/or processing order of the received inter-subnet messages 16.

According to embodiments, the network 100 may be configured to run the consensus protocol separately on each subnet. In other words, each of the subnets SNA, SNB, SNC and SND runs its own consensus protocol separately and independently from the other subnets. Accordingly, each of the subnets SNA, SNB, SNC and SND can decide on its own and independently from the other subnets which received messages to select and process and in which order. Hence each of the subnets SNA, SNB, SNC and SND reaches a consensus on a per-subnet basis on the selection and processing order of the received inter-subnet messages 16. Such a consensus may also be considered as a local consensus or a subnet-consensus.

This concept is illustrated in more detail with reference to FIG. 3.

Figure 3:
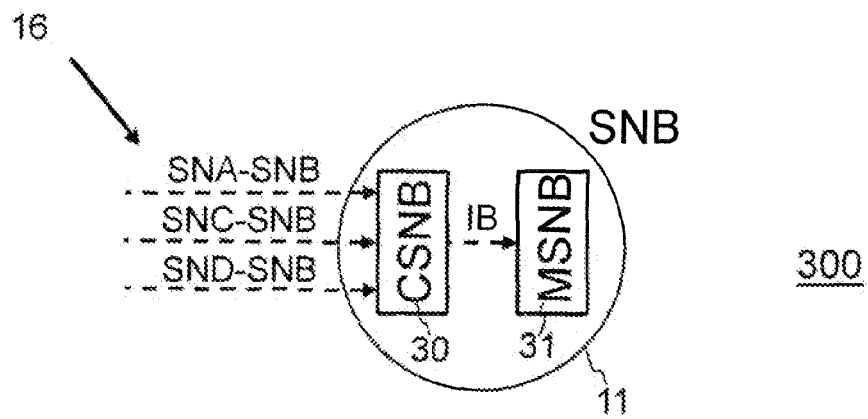
FIG. 3 shows a schematic illustration of inter-subnet messages which are received at a subnet.

FIG. 3 shows a schematic illustration of inter-subnet messages 16 which are received at the subnet 11, SNB of FIG. 1

The subnet SNB receives inter-subnet messages SNA-SNB from the subnet SNA, inter-subnet messages SNC-SNB from the subnet SNC and inter-subnet messages SND-SNB from the subnet SND. These pool of inter-subnet messages is processed by a consensus component 30, CSNB which runs locally a consensus protocol on the subnet SNB. Hence the consensus component 30 may be denoted as subnet consensus component.

The consensus component 30 generates a queue of input blocks IB from the inter-subnet messages according to a predefined consensus algorithm or mechanism and provides the queue of input blocks IB to a messaging component 31, MSNB which is configured to run a messaging protocol and to further process the input blocks IB.

According to embodiments each of the nodes 10 of a respective subnet 11 may participate in the consensus protocol. According to such embodiments, each of the subnets 11 may comprise e.g. 10 to 100 nodes, in particular 20 to 50 nodes. Such numbers may provide an advantageous compromise between security and efficiency.

According to other embodiments, the consensus protocol may be configured to elect members of a committee from the plurality of nodes 10 of the respective subnet 11 according to a predefined election scheme and to perform the consensus protocol only with the elected members of the committee. Such an approach is in particular useful for subnets with a larger number of nodes, e.g. for subnets with 1000 or more nodes.

Figure 4:
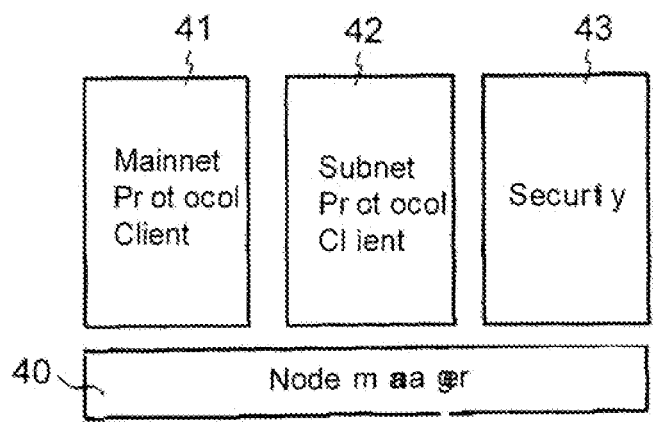
FIG. 4 illustrates main processes which are run on each node of the network according to an embodiment of the invention.

FIG. 4 illustrates main processes which are run on each node 10 of the network 100 according to an embodiment of the invention. A network client of networks according to embodiments of the invention is the set of protocol components that are necessary for a node 10 to participate in the network. According to embodiments, each node 10 is a member of a mainnet and of at most one subnet, which means that each node runs a client for the mainnet and possibly a client for the subnet.

A node manager 40 is configured to start, restart and update a mainnet protocol client 41, a subnet protocol client 42 and a security application 43.

According to embodiments, each of the plurality of subnets 11 is configured to run a separate subnet protocol client 42 on its corresponding nodes 10. The mainnet protocol client 41 is in particular configured to distribute configuration data to and between the plurality of subnets 11. The mainnet protocol client 41 may be in particular configured to run only system computational units, but not any user-provided computational units. The mainnet protocol client 41 is the local client of the mainnet and the subnet protocol client 42 is the local client of the subnet.

The security application 43 stores secret keys of the nodes 10 and performs all operations with them.

The security application 43 is configured to protect the secret keys held by a node. More particularly, the secret keys are held and processed in a separate execution environment (either a separate process or a separate virtual machine (VM). The security application 43 is configured to operate with limited and controlled interfaces such that the secret keys cannot be extracted via these interfaces. According to embodiments, the security application is configured to operate like a hardware security module (HSM) or similar to a HSM. Hence the security application 43 may be denoted as a Software HSM.

Figure 5:
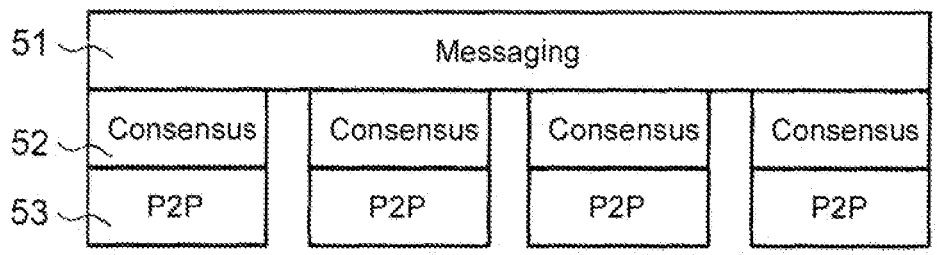
FIG. 5 shows a layer model illustrating main layers which are involved in the exchange of inter-subnet and intra-subnet messages.

FIG. 5 shows a layer model 500 illustrating main layers which are involved in the exchange of inter-subnet and intra-subnet messages. The layer model 500 comprises a messaging layer 51 which is configured to serve as an upper layer for the inter-subnet communication. More particularly, the messaging layer 51 is configured to route inter subnet messages between computational units of different subnets. Furthermore, the messaging layer 51 is configured to route ingress messages from users of the network to computational units of the network.

The layer model 500 further comprises a plurality of consensus layers 52 which are configured to receive inter-subnet messages from different subnets as well as ingress messages and to organize them, in particular by agreeing on a processing order, in a sequence of input blocks which are then further processed by the respective subnet. In addition, the layer model 500 comprises a peer-to-peer (P2P) layer that is configured to organize and drive communication between the nodes of a single subnet.

According to embodiments, the network may comprise a plurality of further layers, in particular an execution layer which is configured to execute execution messages on the computational units of the network.

Figure 6:
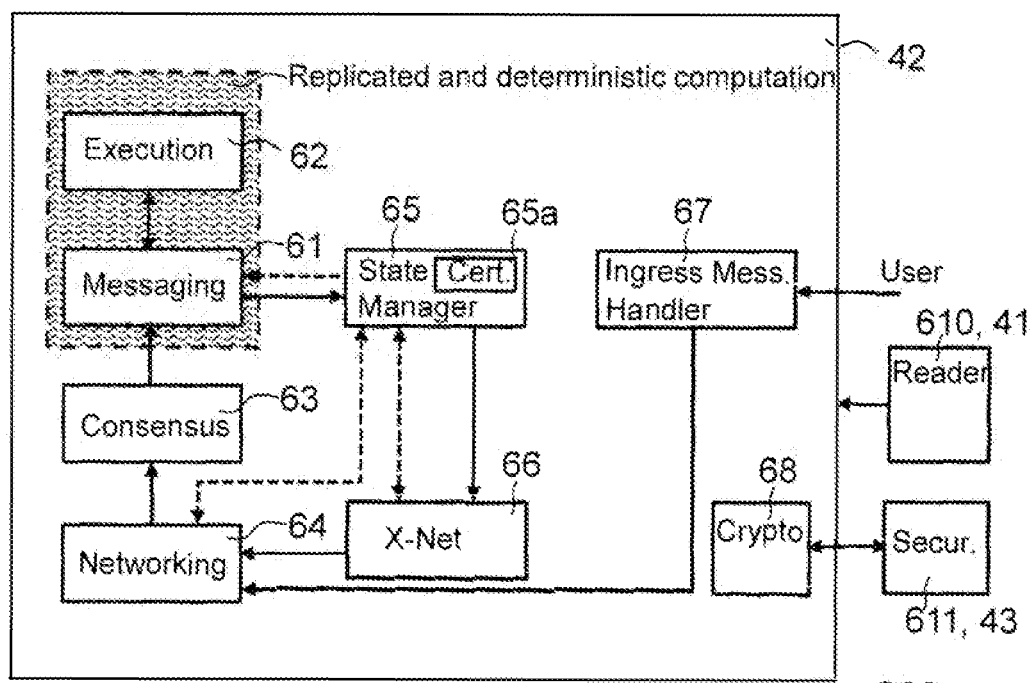
FIG. 6 shows a schematic block diagram of protocol components of a subnet protocol client.

FIG. 6 shows a schematic block diagram of protocol components 600 of a subnet protocol client, e.g. of the subnet protocol client 42 of FIG. 4.

Full arrows in FIG. 6 are related to unit-to-unit messages and ingress messages. Dashed arrows relate to system information.

The protocol components 600 comprise a messaging component 61 which is configured to run the messaging protocol and an execution component 62 configured to run an execution protocol for executing execution messages, in particular for executing unit-to-unit messages and/or ingress messages. The protocol components 600 further comprise a consensus component 63 configured to run a consensus protocol, a networking component 64 configured to run a networking protocol, a state manager component 65 configured to run a state manager protocol, an X-Net component 66 configured to run a cross-subnet transfer protocol and an ingress message handler component 67 configured to handle ingress message received from an external user of the network. The protocol components 600 comprise in addition a crypto-component 68. The crypto-component 68 co-operates with a security component 611, which may be e.g. embodied as the security application 43 as described with reference to FIG. 4. Furthermore, the subnet-protocol client 42 may cooperate with a reader component 610, which may be a part of the mainnet protocol client 41 as described with reference to FIG. 4. The reader component 610 may provide information that is stored and distributed by the mainnet to the respective subnet protocol client 42. This includes the assignment of nodes to subnets, node public keys, assignment of computational units to subnets etc.

The messaging component 61 and the execution component 62 are configured such that all computation, data and state in these components is identically replicated across all nodes of the respective subnet, more particularly all honest nodes of the respective subnet. This is indicated by the wave-pattern background of these components.

Such an identical replication is achieved according to embodiments on the one hand by virtue of the consensus component 63 that ensures that the stream of inputs to the messaging component 61 is agreed upon by the respective subnet and thus identical for all nodes, more particularly by all honest nodes. On the other hand, this is achieved by the fact that the messaging component 61 and the execution component 62 are configured to perform a deterministic and replicated computation.

The X-Net Transfer component 66 sends message streams to other subnets and receives message streams from other subnets.

Most components will access the crypto component 68 to execute cryptographic algorithms and the mainnet reader 70 for reading configuration information.

The execution component 62 receives from the messaging component 61 a unit state of the computational unit and an incoming message for the computational unit, and returns an outgoing message and the updated unit state of the computational unit. While performing the execution, it may also measure a gas consumption of the processed message (query).

The messaging component 61 is clocked by the input blocks received from the consensus component 63. That is, for each input block, the messaging component 61 performs steps as follows. It parses the respective input blocks to obtain the messages for its computational units. Furthermore, it routes the messages to the respective input queues of the different computational units and schedules messages to be executed according to the capacity each computational unit got assigned. Then it uses the execution component 62 to process a message by the corresponding computational unit, resulting in messages to be sent being added to an output queue of the respective computational unit. However, when the message is destined to a computational unit on the same subnet it may be put directly in the input queue of the corresponding computational unit. The messaging component 61 finally routes the messages of the output queues of the computational units into message streams for subnets on which the receiving computational units are located and forwards these message streams to the state manager component 65 to be certified, i.e., signed by the respective subnet.

The state manager component 65 comprises a certification component 65a. The certification component 65a is configured to certify the output streams of the respective subnet.

This may be performed e.g. by a threshold-signature, a multi-signature or a collection of individual signatures of the computational units of the respective subnet.

Figure 7:
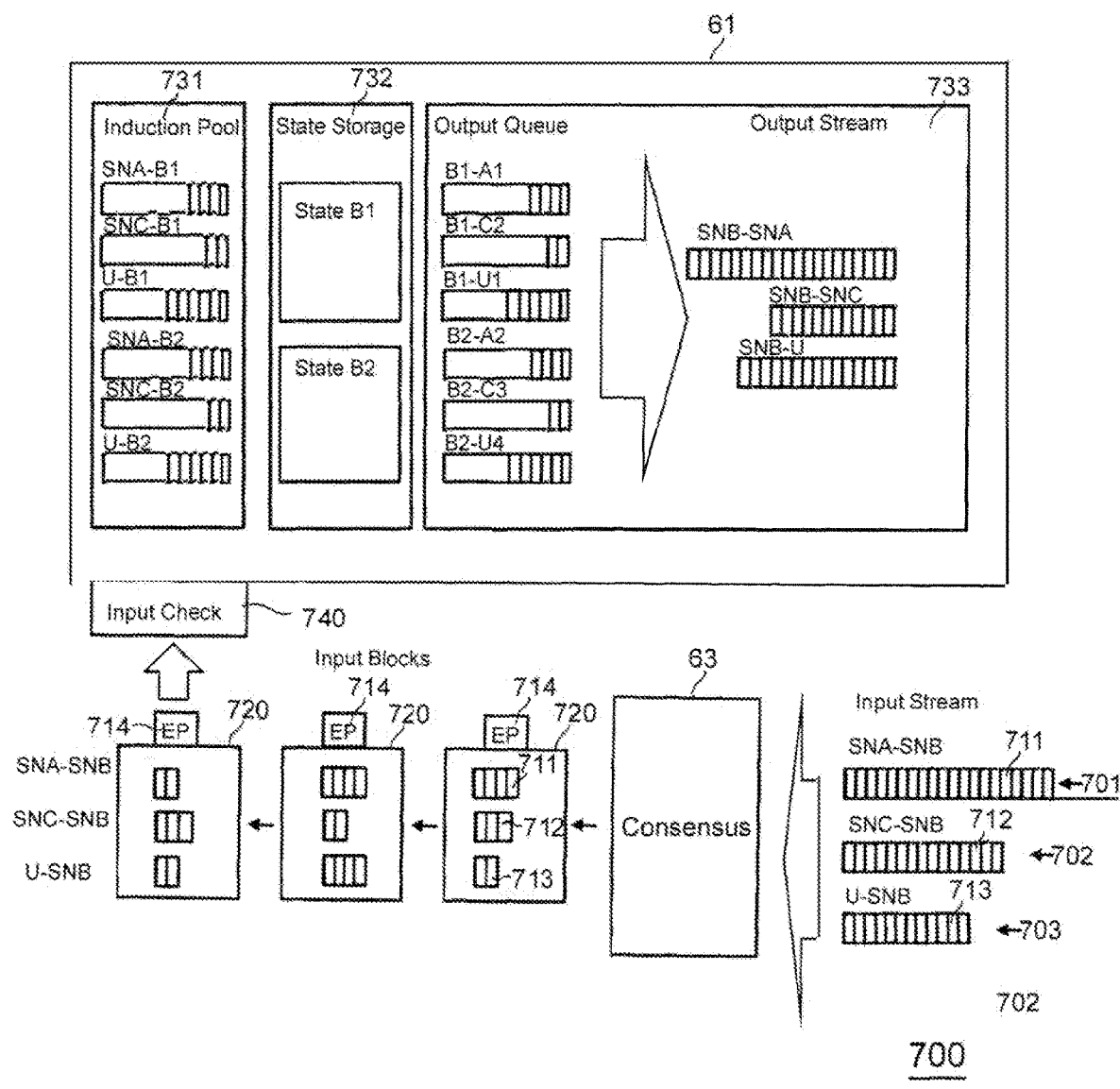
FIG. 7 shows an exemplary visualization of a workflow of the messaging protocol and the consensus protocol and the associated components.

FIG. 7 shows an exemplary visualization of a workflow 700 of the messaging protocol and the consensus protocol and the associated components, e.g. of the messaging component 61 and the consensus component 63 of FIG. 6. More particularly, FIG. 7 visualizes the workflow of inter-subnet messages exchanged between a subnet SNB and subnets SNA and SNC. Furthermore, the subnet SNB exchanges ingress messages with a plurality of user U.

Starting from the bottom right of FIG. 7, a plurality of input streams 701, 702 and 703 is received by a consensus component 63. The consensus component 63 is a subnet consensus component that is run by a subnet client of the subnet SNB. The input stream 701 comprises inter-subnet messages 711 from the subnet SNA to the Subnet SNB. The input stream 702 comprises inter-subnet messages 712 from the subnet SNC to the Subnet SNB. The input stream 703 comprises ingress messages 713 from the plurality of users U to the subnet SNB.

The inter-subnet messages 711 and 712 comprise inter-subnet unit-to-unit messages to be exchanged between the computational units of the different subnets as well as signalling messages. The signalling messages are used to acknowledge or not acknowledge an acceptance of unit-to-unit messages. The messaging component 61 is configured to send the signalling messages from a receiving subnet to a corresponding sending subnet, i.e. in this example from the subnet SNB to the subnets SNA and SNC. The messaging component 61 is according to this example configured to store the sent inter-subnet unit-to-unit messages until an acknowledgement message has been received for the respective unit-to-unit message. This provides a guaranteed delivery.

The consensus component 63 is configured to receive and process the inter-subnet messages 711, 712 of the subnets SNA, SNC and the ingress messages 713 of the users U and to generate a queue of input blocks 720 from the inter-subnet messages 711, 712 and the ingress messages 713 according to a predefined consensus mechanism that is executed by the corresponding consensus protocol. Each input block 720 produced by consensus contains a set of ingress messages 713, a set of inter-subnet messages 711, 712 and execution parameters 714, EP. The execution parameters 714, EP may include in particular a random seed, a designated execution time and/or a height index. The consensus component 63 may also vary the number of messages in every input block based on the current load of the subnet.

The consensus component 63 provides the queue of input blocks 720 then to the messaging component 61 which is configured to execute the messaging protocol and to process the input blocks 720.

The messaging protocol and the messaging component 61 are clocked by the input blocks 720 received from the consensus component 63.

Before processing the received input blocks, the messaging component 61 may perform one or more pre-processing steps including one or more input checks. The input checks may be performed by an input check component 740.

The input checks may be performed with different granularity according to embodiments. At first, the input checks may be performed for the whole input block. Such checks may also be denoted as input block checks. These may comprise a check of the height of the next input block. If the height of the next input block is lower than expected next in sequence, then it is discarded. If the input block is not the expected next in sequence, then the messaging component 61 may trigger a node catch up protocol. If the input block is the next in sequence, then it is further processed by the messaging component 61.

The different types of messages (signalling messages, ingress messages, unit-to-unit messages) in the input blocks may be grouped together.

The input checks may further comprise an overload check to check whether the messaging component is currently overloaded and does not have enough capacity to perform the processing. If e.g. the relevant queue in the induction pool is full, the corresponding message may be rejected. Further input checks may comprise an in-order delivery check. To satisfy the in-order delivery requirement, messages can be annotated e.g. with sequence numbers. If a message with a sequence number is received, the messaging component 61 may check whether it has the expected number, and if not, may reject it. Furthermore, the input check component 740 may perform a validity check of the target destination, i.e. whether a message targets a computational unit that is active on the corresponding subnet.

If the input checks have been passed successfully, the messages of the respective input block 720 may be further processed by the messaging component 61 and the corresponding messages may be appended to a corresponding queue in an induction pool of an induction pool component 731. The induction pool component 731 of the messaging component 61 receives input blocks and input messages that have been successfully passed the input check component 740 and have accordingly been accepted by the messaging component 61 for further processing.

In general, Lite messaging component 61 preprocesses the input blocks 720 by placing ingress messages, signalling messages and inter-subnet messages into the induction pool component 731 as appropriate. Signalling messages in the subnet streams are treated as acknowledgements of messages of the output queues which can be purged.

In this example, the induction pool component 731 comprises subnet-to-unit queues SNA-B1, SNC-B1, SNA-B2 and SNC-B2 as well as user-to-unit queues U-B1 and U-B2.

Following these pre-processing steps, the messaging component 61 invokes the execution component 62 (see FIG. 6) to execute as much of the induction pool as is feasible during a single execution cycle, providing the designated execution time and the random seed as additional inputs. Following the execution cycle, a resulting output queue of messages, which may also be denoted as output messages, is fed to an output queue component 733. Initially the output queue component 733 comprises unit-to-unit and unit-to-user output queues, in this example the unit-to-unit output queues B1-A1, B1-C2, B2-A2 and B2-C3 and the unit-to-user output queues B1-U1 and B2-U4. As an example, the messages B1-A1 denote output messages from the computational unit B1 of subnet SNB to the computational unit A1 of subnet SNA. As another example, the messages B1-U1 denote output messages from the computational unit B1 of subnet SNB to the user U1.

The output queue component 733 post-processes the resulting output queue of the output messages by forming a set of per-subnet output streams to be certified, e.g. by the certification component 65a as shown in FIG. 6, and disseminated by other components. In this example, the per-subnet output streams SNB-SNA, SNB-SNC and SNB-U are provided.

Hence the messaging component 61 further comprises a state storage component 732 that is configured to store the state/unit state of the computational units of the respective subnet, in this example the states of the computational units B1 and B2 of the subnet SNB. The corresponding unit state is the working memory of each computational unit.

The messaging component 61 revolves around mutating certain pieces of system state deterministically. In each round, the execution component 61 will execute certain messages from the induction pool by reading and updating the state of the respective computational unit and return any outgoing messages the executed computational unit wants to send. These outgoing messages or in other words output messages go into the output queue component 733, which initially contains unit-to unit messages between computational units of the network. While intra-subnet messages between computational units of the same subnet may be routed and distributed internally within the respective subnet, inter-subnet messages are routed into output streams sorted by subnet-destinations.

In addition, two pieces of state may be maintained according to embodiments to inform the rest of the system about which messages have been processed. A first piece may be maintained for inter-subnet messages and a second piece of state for ingress messages.

In the following the interactions between the mainnet protocol clients 41 and the subnet protocol clients 42 is described in more detail (see FIG. 4). The mainnet protocol clients 41 manages a number of registries that contain configuration information for the subnets. These registries are implemented by computational units on the mainnet and, as all nodes are participating in the mainnet, access to these registries can simply be implemented by a state read operation.

That is, the subnet component Reader, 610 in FIG. 6 (mainnet reader) may be in fact a sub-component of the mainnet protocol client 41 and therefore interaction with this component results in interaction between the two isolated environments in which the mainnet and subnet clients run.

Furthermore, as all nodes participate in the mainnet, it is much larger than subnets and therefore it will take longer for a message to spread to all nodes.

Figure 8:
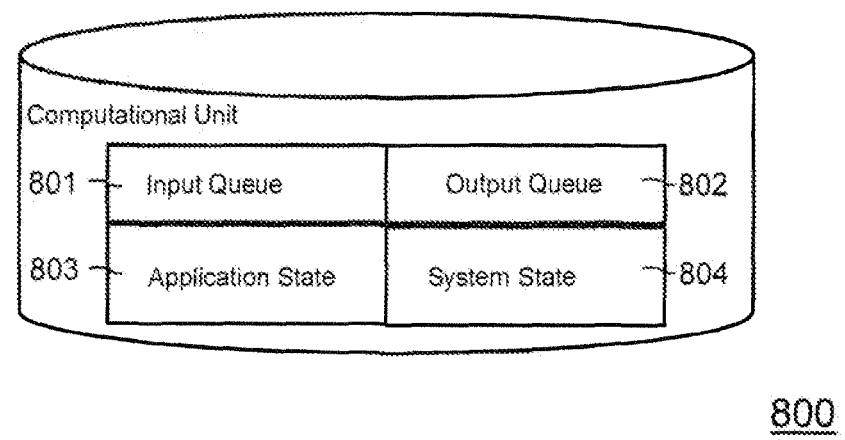
FIG. 8 shows a more detailed illustration of a computational unit according to an embodiment of the invention.

FIG. 8 shows a more detailed illustration of a computational unit 800 according to an embodiment of the invention.

The computational unit 800 comprises an input queue 801, an output queue 802, an application state 803 and a system state 804.

Figure 9:
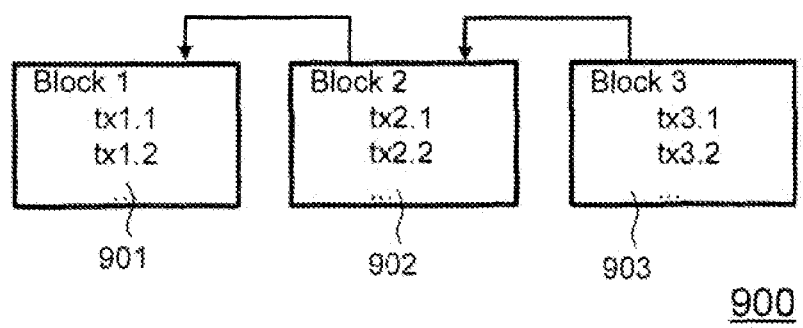
FIG. 9 illustrates the creation of input blocks by a consensus component according to an exemplary embodiment of the invention.

FIG. 9 illustrates the creation of blocks in distributed networks according to embodiments of the invention. The blocks may be in particular the input blocks 720 shown in FIG. 7 which are created by the consensus component 63 that runs the consensus protocol, in particular a local subnet consensus protocol.

In this exemplary embodiment three input blocks 901, 902 and 903 are illustrated. Block 901 comprises a plurality of transactions, namely the transactions tx1.1, tx1.2 and possibly further transactions indicated with dots. Block 902 comprises also a plurality of transactions, namely the transactions tx2.1, tx2.2 and possibly further transactions indicated with dots. Block 903 also comprises a plurality of transactions, namely the transactions tx3.1, tx3.2 and possibly further transactions indicated with dots. The input blocks 901, 902 and 903 are chained together. More particularly, each of the blocks comprises a block hash of the previous block. This cryptographically ties the current block to the previous block(s).

According to embodiments the transactions may be inter-subnet messages, ingress messages and signalling messages.

According to embodiments, the input blocks 901, 902 and 903 may be created by a proof-of-stake consensus-protocol.

However, it should be noted that the input blocks generated by the consensus component do not need to be chained together according to embodiments. Rather any consensus protocol that reaches some kind of consensus between the nodes of a subnet on the processing order of received messages may be used according to embodiments.

FIG. 10 shows a more detailed view of a networking component 1000, which is configured to run a networking protocol. The networking component 1000 may be e.g. a more detailed embodiment of the networking component 64 shown in FIG. 6. The networking component 1000 comprises a unicast component 1010 configured to perform a node-to-node communication, a broadcast component 1020 configured to perform an intra-subnet communication and a cross-net component 1030 configured to perform an inter-subnet communication. The cross-net component 1030 may store the subnet-assignment of the computational units as network configuration data.

Figure 11:
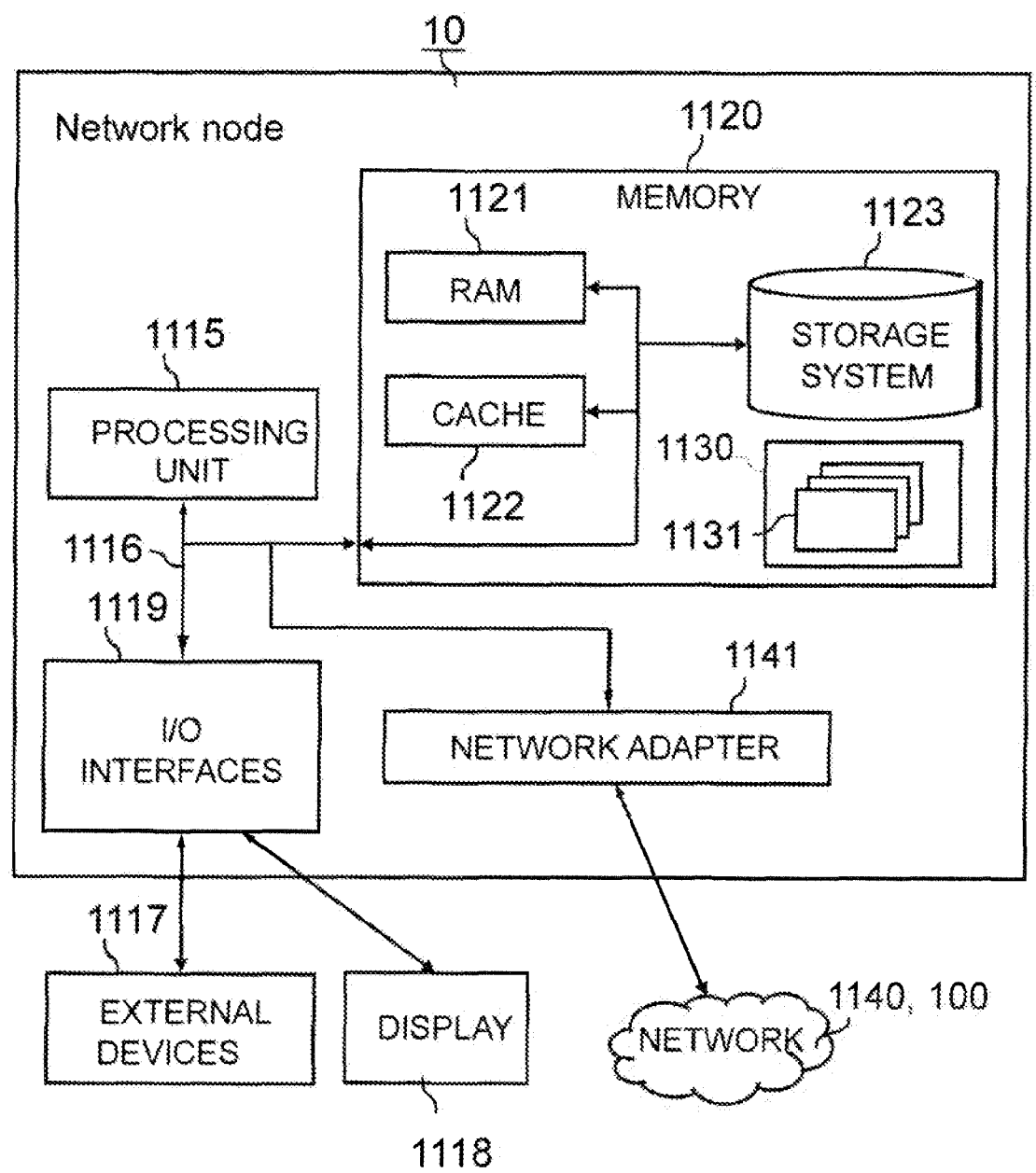
FIG. 11 shows an exemplary embodiment of a network node according to an embodiment of the invention.

Referring now to FIG. 11, a more detailed block diagram of a network node 10 according to embodiments of the invention is shown, e.g. of the network 100 of FIG. 1. The network node 10 establishes a computing node that may perform computing functions and may hence be generally embodied as computing system or computer. The network node 10 may be e.g. a server computer. The network node 10 may be configured to perform a computer-implemented method for performing inter-subnet communication and a consensus protocol, in particular a proof-of-stake consensus protocol. The network node 10 may be operational with numerous other general purpose or special purpose computing system environments or configurations.

The network node 10 may be described in the general context of computer system-executable instructions, such as program modules, being executed by a computer system. Generally, program modules may include routines, programs, objects, components, logic, data structures, and so on that perform particular tasks or implement particular abstract data types. The network node 10 is shown in the form of a general-purpose computing device. The components of network node 10 may include, but are not limited to, one or more processors or processing units 1115, a system memory 1120, and a bus 1116 that couples various system components including system memory 1120 to processor 1115.

Bus 1116 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network node 10 typically includes a variety of computer system readable media. Such media may be any available media that is accessible by network node 10, and it includes both volatile and non-volatile media, removable and non-removable media.

System memory 1120 can include computer system readable media in the form of volatile memory, such as random access memory (RAM) 1121 and/or cache memory 1122. Network node 1110 may further include other removable/non-removable, volatile/non-volatile computer system storage media. By way of example only, storage system 1123 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1116 by one or more data media interfaces. As will be further depicted and described below, memory 1120 may include at least one computer program product having a set (e.g., at least one) of program modules that are configured to carry out the functions of embodiments of the invention.

Program/utility 1130, having a set (at least one) of program modules 1131, may be stored in memory 1120 by way of example, and not limitation, as well as an operating system, one or more application programs, other program modules, and program data. Each of the operating system, one or more application programs, other program modules, and program data or some combination thereof, may include an implementation of a networking environment. Program modules 1131 generally carry out the functions and/or methodologies of embodiments of the invention as described herein. Program modules 1131 may carry out in particular one or more steps of a computer-implemented method for performing inter-subnet communication including a consensus protocol in a distributed network, e.g. of one or more steps of the methods as described above.

Network node 10 may also communicate with one or more external devices 1117 such as a keyboard or a pointing device as well as a display 1118. Such communication can occur via Input/Output (I/O) interfaces 1119. Still yet, network node 10 can communicate with one or more networks 40 such as a local area network (LAN), a general wide area network (WAN), and/or a public network (e.g., the Internet) via network adapter 1141. According to embodiments the network 1140 may be in particular a distributed network comprising a plurality of network nodes 10, e.g. the network 100 as shown in FIG. 1. As depicted, network adapter 1141 communicates with the other components of network node 10 via bus 1116. It should be understood that although not shown, other hardware and/or software components could be used in conjunction with network node 10.

FIG. 12a shows a flow chart 1201 comprising method steps of a computer-implemented method for running a distributed network comprising a plurality of subnets according to embodiments of the invention.

FIG. 12b shows a flow chart 1202 comprising method steps of a computer-implemented method for performing inter-subnet communication in such a distributed network. The distributed network may be e.g. embodied as the network 100 as shown in FIG. 1.

Referring to FIG. 12a, at a step 1210, each subnet of the plurality of subnets runs a set of computational units on its nodes, wherein each of the computational units comprises its own unit state.

At a step 1220, the network replicates the set of computational units across the respective subnet.

Referring to FIG. 12b, at a step 1230 a sending subnet sends inter-subnet messages to a receiving subnet.

At a step 1240, the receiving subnet runs or executes a subnet consensus protocol. This may involve all nodes of the subnet or only a selected subset of the nodes of the subnet.

At a step 1250, the receiving subnet reaches a local subnet consensus on the selection and processing order of the received inter-subnet messages by means of the local subnet consensus protocol.

At a step 1260, the receiving subnet processes the received inter-subnet messages according to the selection and processing order which has been agreed upon by means of the local subnet protocol.

Figure 13:
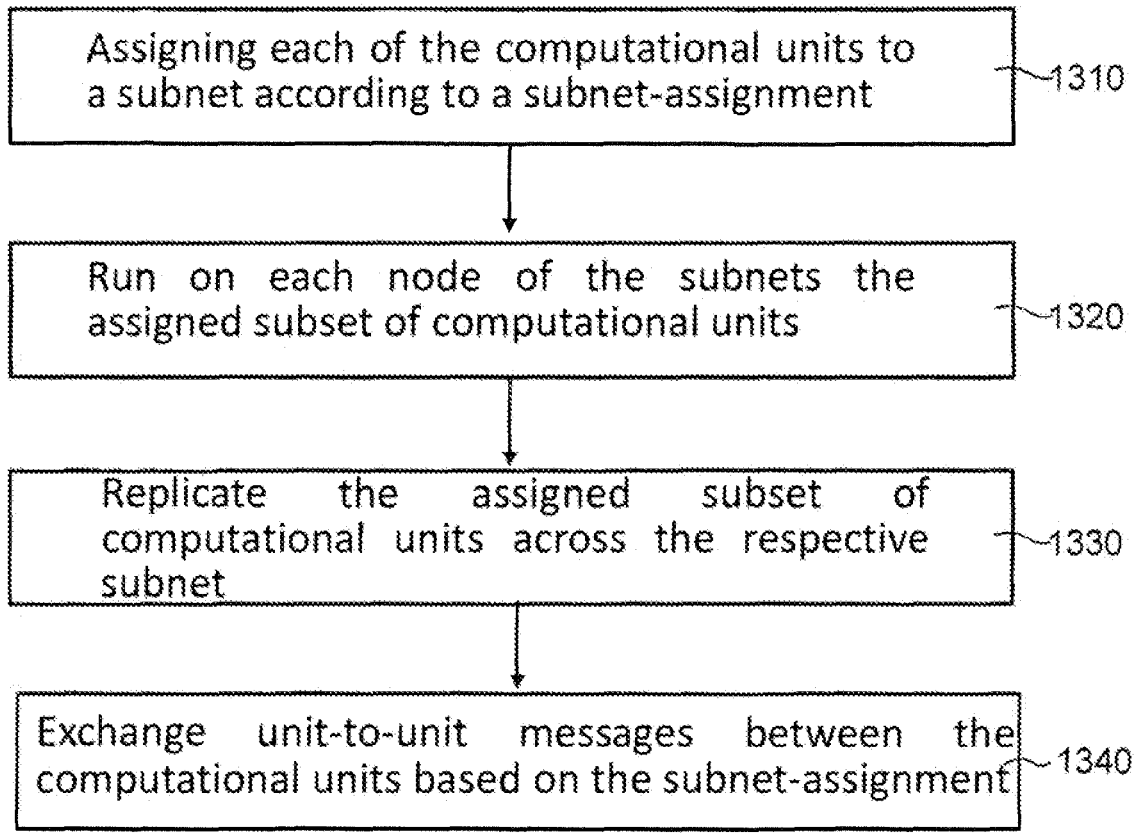
FIG. 13 shows a flow chart comprising method steps of a computer-implemented method for running a distributed network according to embodiments of the invention.

FIG. 13 shows a flow chart 1300 comprising method steps of a computer-implemented method for running a distributed network comprising a plurality of subnets according to embodiments of the invention.

At a step 1310, the distributed network assigns each of the computational units to a subnet according to a subnet-assignment.

At a step 1320, the distributed network runs on each node of the respective subnet the assigned subset of computational units.

At a step 1330, the distributed network replicates the assigned subset of the computational units across the respective network.

At a step 1340, the distributed network exchanges unit-to-unit messages between the computational units based on the subnet-assignment.

Aspects of the present invention may be embodied as a system, in particular a distributed network comprising a plurality of subnets, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, networks, apparatus (systems), and computer program products according to embodiments of the invention.

Computer readable program instructions according to embodiments of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or oilier device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of networks, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While there are shown and described presently preferred embodiments of the invention, it is to be distinctly understood that the invention is not limited thereto but may be otherwise variously embodied and practiced within the scope of the following claims.

The invention claimed is:

1. A distributed network comprising a plurality of subnets; wherein
each of the plurality of subnets comprises a plurality of nodes;
the network is configured to
run a set of computational units;
assign each of the computational units to one of the plurality of subnets according to a sub net-assignment, thereby creating an assigned subset of the set of computational units for each of the subnets;
run on each node of the plurality of subnets the assigned subset of the computational units; and
exchange unit-to-unit messages between the computational units via a messaging protocol based on the subnet-assignment;
wherein the computational units are a piece of software that is running on a node of the distributed network and which has its own unit state, wherein the unit state comprises an input queue and an output queue of unit-to-unit messages;
wherein the network is configured to replicate the unit states of the computational units of the assigned subsets of the computational units across the respective subnet by performing an active replication in space of the assigned subset of the computational units on each node of the respective subnet; and
wherein the unit-to-unit messages comprise
inter-subnet unit-to-unit messages to be exchanged between computational units assigned to different subnets; and
intra-subnet unit-to-unit messages to be exchanged between computational units assigned to the same subnet; and wherein
the network is configured to store the subnet-assignment as network configuration data;
the messaging protocol is configured to perform a deterministic and replicated computation and to exchange the inter-subnet unit-to-unit messages between a sending computational unit and a receiving computational unit by
looking up the subnet-assignment of the receiving computational unit in the network configuration data; and
routing the inter-subnet unit-to-unit message to the subnet that is assigned to the receiving computational unit according to the subnet-assignment.

2. A distributed network according to claim 1, wherein the messaging protocol is configured to route the inter-subnet unit-to-unit messages from a sending subnet to a plurality of receiving sub nets into output streams sorted by the plurality of receiving subnets.

3. A distributed network according to claim 2, further comprising a certification component, the certification component being configured to certify the output streams by the respective subnet.

4. A distributed network according to claim 1, wherein the messaging protocol is further configured to
provide signalling messages adapted to acknowledge or not acknowledge an acceptance of the unit-to-unit messages, in particular of individual unit-to-unit messages.

5. A distributed network according to claim 4, wherein the messaging protocol is configured to
send the signalling messages from a receiving subnet to a corresponding sending subnet;
store sent unit-to-unit messages until the acceptance has been acknowledged.

6. A distributed network according to claim 1, wherein the network is further configured to receive and process ingress messages from users of the network.

7. A distributed network according to claim 1, wherein the network is configured to run a consensus protocol adapted to reach a consensus on a selection and/or processing order of a subset of the unit-to-unit messages.

8. A distributed network according to claim 7, wherein the network is configured to run the consensus protocol as subnet consensus protocol separately on each subnet;
each of the subnets is configured to reach a local subnet consensus on the selection and/or processing order of the unit-to-unit messages received by the respective subnet.

9. A distributed network according to claim 7, wherein each of the plurality of subnets is configured to run a separate subnet protocol client on its nodes, the separate subnet protocol client comprising a separate subnet messaging component and a separate subnet consensus component;

each of the separate consensus protocol clients of the respective subnet is configured to reach a subnet consensus on the selection and/or processing order of the unit-to-unit messages received from one or more other subnets of the plurality of subnets.

10. A distributed network according to claim 7, wherein the consensus protocol is configured to
receive and process the unit-to-unit messages and the ingress messages of the plurality of subnets;
generate a queue of input blocks from the unit-to-unit messages and the ingress messages according to a predefined consensus mechanism;
provide the queue of input blocks to the messaging protocol; and
the messaging protocol is configured to process the input blocks.

11. A distributed network according to claim 10, wherein the messaging protocol is configured to be clocked by the input blocks received from the consensus protocol.

12. A distributed network according to claim 10, wherein the messaging protocol is configured to perform one or more input checks for the input blocks received from the consensus protocol, the one or more input checks comprising
an overload check;
an in-order delivery check; and/or
a validity check of the target destination.

13. A distributed network according to claim 1, wherein the plurality of subnets are configured to perform an active replication in space of the unit state of the assigned subset of computational units on each node of the subnets.

14. A distributed network according to claim 1, wherein the network comprises an execution component configured to run an execution procedure for executing execution messages; and
the execution procedure is configured to perform a deterministic and replicated scheduling and computation of the execution messages.

15. A distributed network according to claim 1, wherein each of the plurality of nodes is configured to run a mainnet protocol client, the mainnet protocol client being configured to distribute the network configuration data comprising the subnet-assignment to the plurality of subnets.

16. A computer-implemented method for performing unit-to-unit communication in a distributed network comprising a plurality of subnets, wherein each of the plurality of subnets comprises a plurality of nodes, the method comprising
running a set of computational units;
assigning each of the computational units to one of the plurality of subnets according to a subnet-assignment, thereby creating an assigned subset of the set of computational units for each of the subnets;
running on each node of the plurality of subnets the assigned subset of the computational units; and
exchanging unit-to-unit messages between the computational units via a messaging protocol based on the subnet-assignment; wherein
the computational units are a piece of software that is running on a node of the distributed network and which has its own unit state, wherein the unit state comprises an input queue and an output queue of unit-to-unit messages;
wherein the unit-to-unit messages comprise
inter-subnet unit-to-unit messages to be exchanged between computational units assigned to different subnets; and
intra-subnet unit-to-unit messages to be exchanged between computational units assigned to the same subnet; and wherein the method further comprises
replicating the unit states of the computational units of the assigned subsets of the computational units across the respective subnet by performing an active replication in space of the assigned subset of the computational units on each node of the subnets;
storing, by the network, the subnet-assignment as network configuration data;
performing, by the messaging protocol, a deterministic and replicated computation;
exchanging, by the messaging protocol, the inter-subnet unit-to-unit messages between a sending computational unit and a receiving computational unit by
looking up the subnet-assignment of the receiving computational unit in the network configuration data; and
routing the inter-subnet unit-to-unit message to the subnet that is assigned to the receiving computational unit according to the subnet-assignment.

17. A node for a distributed network, the distributed network comprising a plurality of subnets each comprising a plurality of nodes, the distributed network being configured to run a set of computational units and to assign each of the computational units to one of the plurality of subnets according to a subnet-assignment, thereby creating an assigned subset of the set of computational units for each of the subnets, the node comprising one or more processors and a non-transitory computer readable storage medium storing program instructions executable by the one or more processors to perform a method comprising
running its assigned subset of the computational units according to the subnet-assignment;
exchanging unit-to-unit messages between the computational units via a messaging protocol based on the subnet-assignment; wherein
the computational units are a piece of software that is running on the node and which has its own unit state, wherein the unit state comprises an input queue and an output queue of unit-to-unit messages;
wherein the unit-to-unit messages comprise
inter-subnet unit-to-unit messages to be exchanged between computational units assigned to different subnets; and
intra-subnet unit-to-unit messages to be exchanged between computational units assigned to the same subnet; and wherein the method further comprises
replicating the unit states of the computational units of the assigned subsets of the computational units across the respective subnet by performing an active replication in space of the assigned subset of the computational units on each node of the subnets;
performing, by the messaging protocol, a deterministic and replicated computation;
exchanging, by the messaging protocol, the inter-subnet unit-to-unit messages between a sending computational unit and a receiving computational unit by
looking up a subnet-assignment of the receiving computational unit in network configuration data; and
routing the inter-subnet unit-to-unit message to the subnet that is assigned to the receiving computational unit according to the subnet-assignment.

18. A computer program product for operating a distributed network, the distributed network comprising a plurality of subnets, the computer program product comprising a non-transitory computer readable storage medium having program instructions embodied therewith, the program instructions executable by one or more of the plurality of nodes to cause the one or more of the plurality of nodes to perform a method comprising
running a set of computational units;
assigning each of the computational units to one of the plurality of subnets according to a sub net-assignment, thereby creating an assigned subset of the set of computational units for each of the subnets;
running on each node of the plurality of subnets the assigned subset of the computational units;
replicating the assigned subsets of the computational units across the respective subnet; and
exchanging unit-to-unit messages between the computational units via a messaging protocol based on the subnet-assignment; wherein
the computational units are a piece of software that is running on a node of the distributed network and which has its own unit state, wherein the unit state comprises an input queue and an output queue of unit-to-unit messages;
wherein the unit-to-unit messages comprise
inter-subnet unit-to-unit messages to be exchanged between computational units assigned to different subnets; and
intra-subnet unit-to-unit messages to be exchanged between computational units assigned to the same subnet; and wherein the method further comprises
replicating the unit states of the computational units of the assigned subsets of the computational units across the respective subnet by performing an active replication in space of the assigned subset of the computational units on each node of the subnets;
storing, by the network, the subnet-assignment as network configuration data;
performing, by the messaging protocol, a deterministic and replicated computation;
exchanging, by the messaging protocol, the inter-subnet unit-to-unit messages between a sending computational unit and a receiving computational unit by
looking up the subnet-assignment of the receiving computational unit in the network configuration data; and
routing the inter-subnet unit-to-unit message to the subnet that is assigned to the receiving computational unit according to the subnet-assignment.

19. A computer program product for operating a node of a distributed network, the distributed network comprising a plurality of subnets each comprising a plurality of nodes, the distributed network being configured to run a set of computational units and to assign each of the computational units to one of the plurality of subnets according to a subnet-assignment, thereby creating an assigned subset of the set of computational units for each of the subnets, the computer program product comprising a computer readable storage medium having program instructions embodied therewith, the program instructions executable by the node to cause the node to perform a method comprising
running its assigned subset of the computational units;
exchanging unit-to-unit messages between the computational units via a messaging protocol based on the subnet-assignment; wherein
the computational units are a piece of software that is running on the node and which has its own unit state, wherein the unit state comprises an in-put queue and an output queue of unit-to-unit messages;
wherein the unit-to-unit messages comprise
inter-subnet unit-to-unit messages to be exchanged between computational units assigned to different subnets; and
intra-subnet unit-to-unit messages to be exchanged between computational units assigned to the same subnet; and wherein the method further comprises
replicating the unit states of the computational units of the assigned subsets of the computational units across the respective subnet by performing an active replication in space of the assigned subset of the computational units on each node of the subnets;
performing, by the messaging protocol, a deterministic and replicated computation;
exchanging, by the messaging protocol, the inter-subnet unit-to-unit messages between a sending computational unit and a receiving computational unit by
looking up a subnet-assignment of the receiving computational unit in network configuration data; and
routing the inter-subnet unit-to-unit message to the subnet that is assigned to the receiving computational unit according to the subnet-assignment.

* * * * *